(12) United States Patent
Arora et al.

(10) Patent No.: US 11,138,576 B2
(45) Date of Patent: Oct. 5, 2021

(54) METHOD AND SYSTEM FOR NET SETTLEMENT OF WITHHELD FUNDS VIA BLOCKCHAIN

(71) Applicant: MASTERCARD INTERNATIONAL INCORPORATED, Purchase, NY (US)

(72) Inventors: Ankur Arora, New Delhi (IN); Aditya Koduri, Haryana (IN); Shubhangi Sengar, Jabalpur (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 0 days.

(21) Appl. No.: 16/693,648

(22) Filed: Nov. 25, 2019

(65) Prior Publication Data

US 2021/0158312 A1 May 27, 2021

(51) Int. Cl.
| | |
|---|---|
| *G06Q 20/10* | (2012.01) |
| *G06Q 20/40* | (2012.01) |
| *G06Q 20/04* | (2012.01) |
| *G06Q 20/20* | (2012.01) |
| *G06Q 40/02* | (2012.01) |
| *G06Q 20/02* | (2012.01) |

(52) U.S. Cl.
CPC .............. *G06Q 20/10* (2013.01); *G06Q 20/04* (2013.01); *G06Q 20/20* (2013.01); *G06Q 20/40* (2013.01); *G06Q 40/02* (2013.01); *G06Q 20/02* (2013.01)

(58) Field of Classification Search
CPC ........ G06Q 20/02; G06Q 20/10; G06Q 20/04; G06Q 20/20; G06Q 20/40; G06Q 40/02

USPC ........................................................ 705/3–44
See application file for complete search history.

(56) References Cited

U.S. PATENT DOCUMENTS

| | | | |
|---|---|---|---|
| 10,255,342 B2* | 4/2019 | Madisetti | H04L 9/12 |
| 10,354,325 B1* | 7/2019 | Skala | G06Q 40/04 |
| 10,394,845 B2* | 8/2019 | Madisetti | G06Q 20/3829 |
| 10,445,643 B2* | 10/2019 | Katz | G06K 9/00221 |
| 10,540,640 B1* | 1/2020 | James | G06Q 40/04 |

(Continued)

OTHER PUBLICATIONS

"E-Payments: Use Blockchain Technology to Rout Risk Out of Network Transactions", Electronics for You; ProQuest Document Id: 1873448542, New Delhi, (Mar. 1, 2017).*

(Continued)

*Primary Examiner* — Frantzy Poinvil
(74) *Attorney, Agent, or Firm* — Buchanan Ingersoll & Rooney PC

(57) ABSTRACT

A method for minimizing inter-bank settlement through incremental updates stored via blockchains includes storing three blockchains: a balance blockchain updated periodically that includes an available balance for a plurality of blockchain wallets, a credit blockchain that includes credits made to a blockchain wallet, and a debit blockchain that includes payments made from the blockchain wallet. Holds are placed on related transaction accounts to enable the blockchain wallets to utilize payments made thereto without the need for a transaction account, where the holds are only updated when necessary based on periodic updates to the balance blockchain, thus minimizing settlements performed by the issuing institutions, thus reducing inter-bank settlements and enabling payees to receive payments from a transaction account without their own.

16 Claims, 5 Drawing Sheets

(56) References Cited

U.S. PATENT DOCUMENTS

| | | | |
|---|---|---|---|
| 10,579,643 B2* | 3/2020 | Madisetti | G06F 16/27 |
| 10,643,266 B2* | 5/2020 | Isaacson | G07G 1/01 |
| 2017/0236103 A1* | 8/2017 | Biton | H04L 9/30 |
| | | | 705/64 |
| 2017/0236104 A1* | 8/2017 | Biton | H04L 9/30 |
| | | | 705/64 |
| 2018/0101906 A1* | 4/2018 | McDonald | G06Q 20/204 |
| 2018/0253464 A1* | 9/2018 | Kohli | G06F 16/219 |
| 2019/0228391 A1* | 7/2019 | Hu | G06Q 20/102 |
| 2019/0378137 A1* | 12/2019 | Honey | G06Q 20/24 |
| 2020/0184473 A1* | 6/2020 | Fang | G06Q 20/405 |

OTHER PUBLICATIONS

Chiu, "A new era in fintech payment innovations? A perspective from the institutions and regulation of payment systems", Law, Innovation and Technology, vol. 9, No. 2, 190-234, Year (Year: 2017).*

* cited by examiner

METHOD AND SYSTEM FOR NET SETTLEMENT OF WITHHELD FUNDS VIA BLOCKCHAIN

FIELD

The present disclosure relates to the use of a blockchain to improve net settlement, specifically the use of incremental updates and multiple chains to minimize inter-bank settlement in cases where account debiting is held or delayed.

BACKGROUND

Often times a consumer interested in conducting payment transactions may be issued a transaction account by a financial institution, which they can use for transactions via debit cards, credit cards, checks, or other suitable types of payment instruments. In many cases, transactions involve the consumer's transaction account, as well as the transaction account of another party that is sending or receiving currency with the consumer. Each financial institution will credit or debit their user's transaction account accordingly, and settlement is performed between the financial institutions themselves, separately.

However, in many parts of the world, it may be difficult or impossible for some consumers to be issued a payment account. In these cases, the consumers often use prepaid accounts, prepaid cards, or stick to cash transactions. At the same time, consumers with transaction accounts may have a need to provide payment to consumers that do not have transaction accounts. In such cases, the payer would have to resort to obtaining a prepaid card for the payment amount or paying the payee directly in cash. This may be inconvenient, especially in cases where regular payments may be made or the amounts may exceed what is possible or safe for prepaid cards or cash.

One solution that has been developed is the use of controlled payment numbers. A controlled payment number is an account number that is mapped to a transaction account that is subject to one or more transaction controls, such as a limit on the spending amount allowed for the controlled payment number. With such a solution, a payer could have a controlled payment number generated for their transaction account that is limited to the payment amount, and provide the number to the payee. However, the controls on a controlled payment number could be adjusted at any time by the payer, reducing the payee's ability to control their own money. Additionally, if the payee is receiving payments from multiple sources, they may have several controlled payment numbers to maintain, and with varying amounts associated therewith, may make transacting difficult.

Thus, there is a need for a system where a payee can receive payments from payers without having their own issued transaction account, where the payee can be in control of received payments, and where payments from multiple sources can be aggregated together for use at the same time, resulting in significantly greater convenience and control for payees.

SUMMARY

The present disclosure provides a description of systems and methods for minimizing inter-bank settlement through incremental updates stored via blockchains. When a payer wants to make a payment to a payee without a transaction account, the payment is accomplished via a hold on the payer's own transaction account, with the payment being credited to the payee in a credit blockchain. A balance blockchain is also used to provide an updated balance for each payee in the system at predetermined periods of time. When the payee wants to use their credits, they conduct a transaction using a blockchain wallet that is tied to their balance, and any payment is reflected using a debit blockchain. Each period, the system updates the balance for users based on the daily debits and credits. When the balance for a payee is lowered, a financial institution where a hold has been placed for a payer of that payee is contacted to make a transfer on the held amount corresponding to the lowering balance. The result is the ability for a payee to receive payments from multiple sources without a transaction account, to be able to use a single wallet to access all received payments, and where settlement does not have to occur for issuers where such types of payments have been made until use of the paid currency is actually performed, thus reducing the occurrence of inter-bank settlement and thereby reducing fees and overall payment network traffic.

A method for minimizing inter-bank settlement through incremental updates stored via blockchains includes: storing, in a memory of a processing server, a first blockchain related to available balances, the first blockchain being comprised of a plurality of balance blocks, where at least one of the plurality of balance blocks includes a specific balance data value including a current balance and an account identifier; storing, in the memory of the processing server, a second blockchain related to account credits, the second blockchain being comprised of a plurality of credit blocks, each credit block including one or more credit data values, where the plurality of credit blocks includes two or more credit values that include the account identifier, a payer identifier, and a credit amount; receiving, by a receiver of the processing server, a debit request, the debit request including at least the account identifier, a payee address, and a debit amount, wherein the debit amount is equal to or less than the credit amount included in each of the two or more credit values; generating, by a processor of the processing server, a debit data value, the debit data value including at least the account identifier, the payee address, and the debit amount; publishing, by the processing server, the generated debit value to a third blockchain related to account debits; selecting, by the processor of the processing server, one of the two or more credit values using predetermined criteria after a predetermined period of time; transmitting, by a transmitter of the processing server, a notification message to an issuing financial institution associated with the payer identifier included in the selected credit value, the notification message including at least the debit amount; generating, by the processor of the processing server, an updated balance data value, the updated data balance value including at least the account identifier and an updated balance, the updated balance being based on the current balance, the credit amount included in the two or more credit values, and the debit amount; and publishing, by the processing server, the generated updated balance data value to the first blockchain.

A non-transitory computer readable recording media of a processing server stores program code, the processing server including a processor configured to execute a method for minimizing inter-bank settlement through incremental updates stored via blockchains, where the method includes: storing, in the memory of the processing server, a first blockchain related to available balances, the first blockchain being comprised of a plurality of balance blocks, where at least one of the plurality of balance blocks includes a specific balance data value including a current balance and an account identifier; storing, in the memory of the processing server, a second blockchain related to account credits, the second blockchain being comprised of a plurality of credit blocks, each credit block including one or more credit data values, where the plurality of credit blocks includes two or more credit values that include the account identifier, a payer identifier, and a credit amount; receiving, by a receiver of the processing server, a debit request, the debit request including at least the account identifier, a payee address, and a debit amount, wherein the debit amount is equal to or less than the credit amount included in each of the two or more credit values; generating, by the processor of the processing server, a debit data value, the debit data value including at least the account identifier, the payee address, and the debit amount; publishing, by the processing server, the generated debit value to a third blockchain related to account debits; selecting, by the processor of the processing server, one of the two or more credit values using predetermined criteria after a predetermined period of time; transmitting, by a transmitter of the processing server, a notification message to an issuing financial institution associated with the payer identifier included in the selected credit value, the notification message including at least the debit amount; generating, by the processor of the processing server, an updated balance data value, the updated data balance value including at least the account identifier and an updated balance, the updated balance being based on the current balance, the credit amount included in the two or more credit values, and the debit amount; and publishing, by the processing server, the generated updated balance data value to the first blockchain.

BRIEF DESCRIPTION OF THE DRAWING FIGURES

The scope of the present disclosure is best understood from the following detailed description of exemplary embodiments when read in conjunction with the accompanying drawings. Included in the drawings are the following figures.

Further areas of applicability of the present disclosure will become apparent from the detailed description provided hereinafter. It should be understood that the detailed description of exemplary embodiments are intended for illustration purposes only and are, therefore, not intended to necessarily limit the scope of the disclosure.

DETAILED DESCRIPTION

Glossary of Terms
Blockchain—A public ledger of all transactions of a blockchain-based currency. One or more computing devices may comprise a blockchain network, which may be configured to process and record transactions as part of a block in the blockchain. Once a block is completed, the block is added to the blockchain and the transaction record thereby updated. In many instances, the blockchain may be a ledger of transactions in chronological order, or may be presented in any other order that may be suitable for use by the blockchain network. In some configurations, transactions recorded in the blockchain may include a destination address and a currency amount, such that the blockchain records how much currency is attributable to a specific address. In some instances, the transactions are financial and others not financial, or might include additional or different information, such as a source address, timestamp, etc. In some embodiments, a blockchain may also or alternatively include nearly any type of data as a form of transaction that is or needs to be placed in a distributed database that maintains a continuously growing list of data records hardened against tampering and revision, even by its operators, and may be confirmed and validated by the blockchain network through proof of work and/or any other suitable verification techniques associated therewith. In some cases, data regarding a given transaction may further include additional data that is not directly part of the transaction appended to transaction data. In some instances, the inclusion of such data in a blockchain may constitute a transaction. In such instances, a blockchain may not be directly associated with a specific digital, virtual, fiat, or other type of currency.

System for Minimizing Inter-Bank Settlement Through Incremental Blockchains

Figure 1:
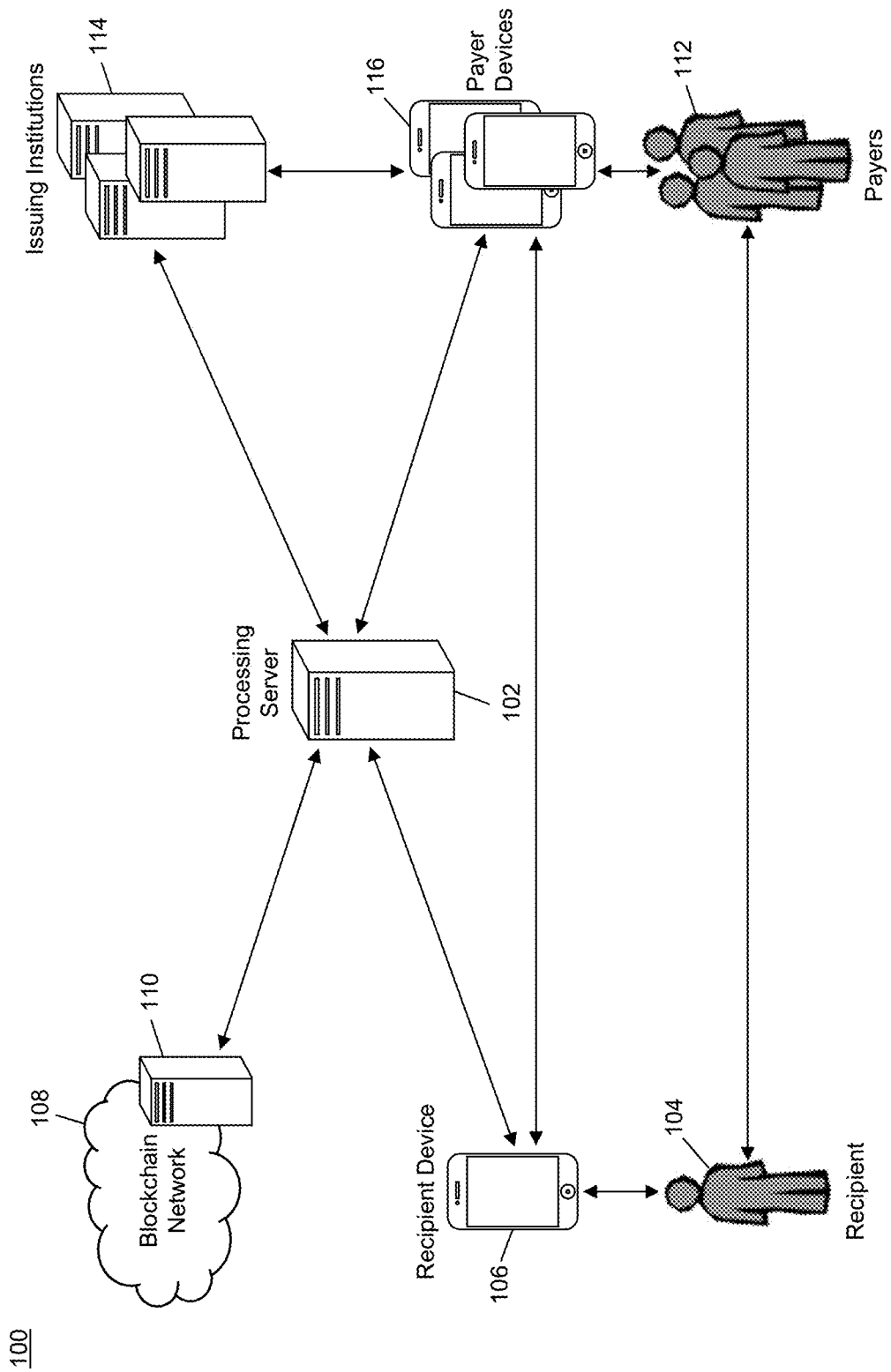
FIG. 1 is a block diagram illustrating a high level system architecture for minimizing inter-bank settlement via blockchains in accordance with exemplary embodiments.

FIG. 1 illustrates a system 100 for minimizing inter-bank settlement for payments made from multiple issuers to a payee that are represented via holds with balance, debit, and credit information being stored via blockchains.

The system 100 may include a processing server 102. The processing server 102, discussed in more detail below, may be configured to participate in the settlement of financial institutions and processing of transactions as discussed herein for recipients 104 in the system 100. In the system 100, a recipient 104 may lack a transaction account through which the recipient 104 may receive payments. The recipient 104 may instead have a recipient device 106 that they may be able to utilize to receive payments and use the money therefrom using the methods and systems discussed herein. The recipient device 106 may be any type of computing device that is configured to perform the functions of the recipient device 106 as discussed herein, such as a specially configured cellular phone, smart phone, smart watch, tablet computer, notebook computer, laptop computer, desktop computer, etc.

Figure 2:
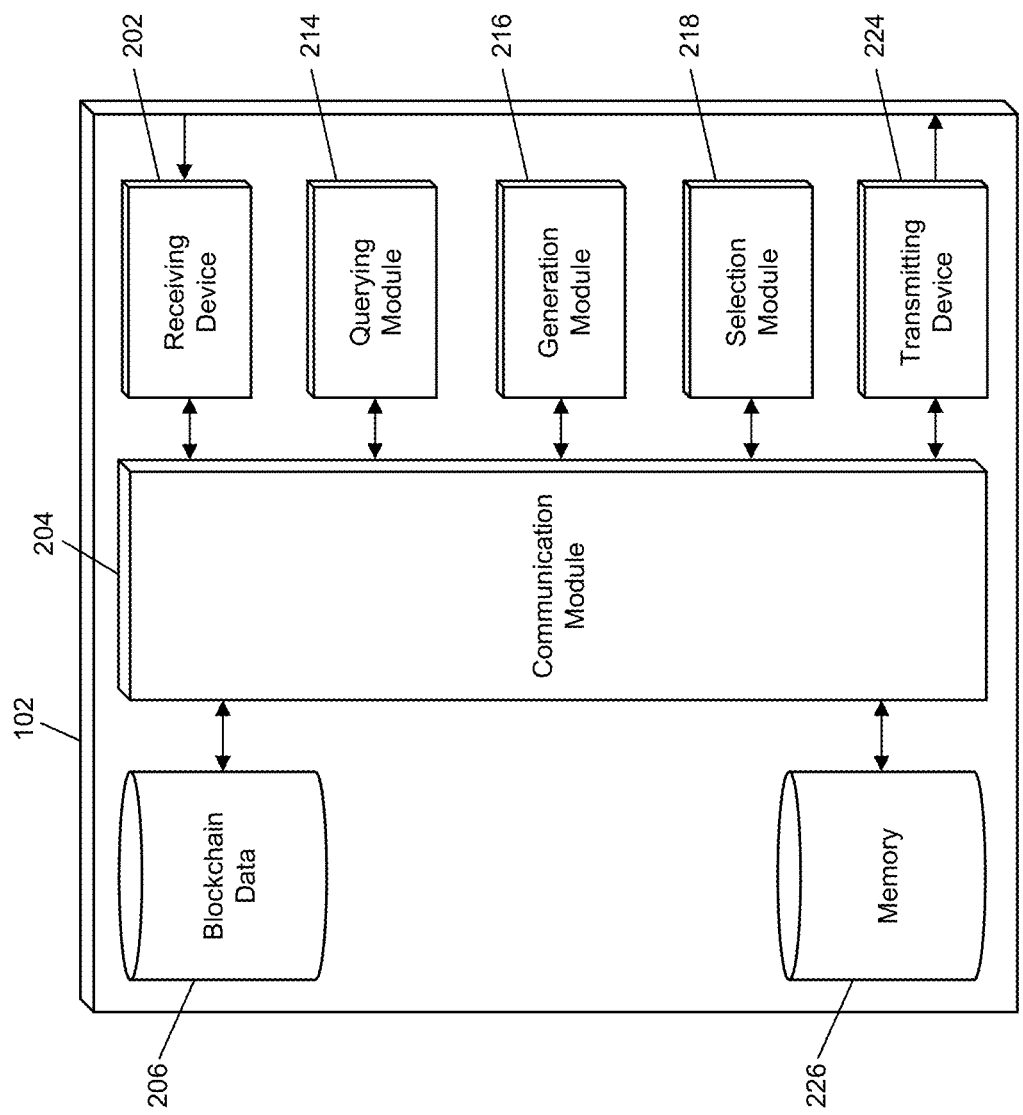
FIG. 2 is a block diagram illustrating the processing server of the system of FIG. 1 for minimizing inter-bank settlements via blockchains in accordance with exemplary embodiments.
Figure 5:
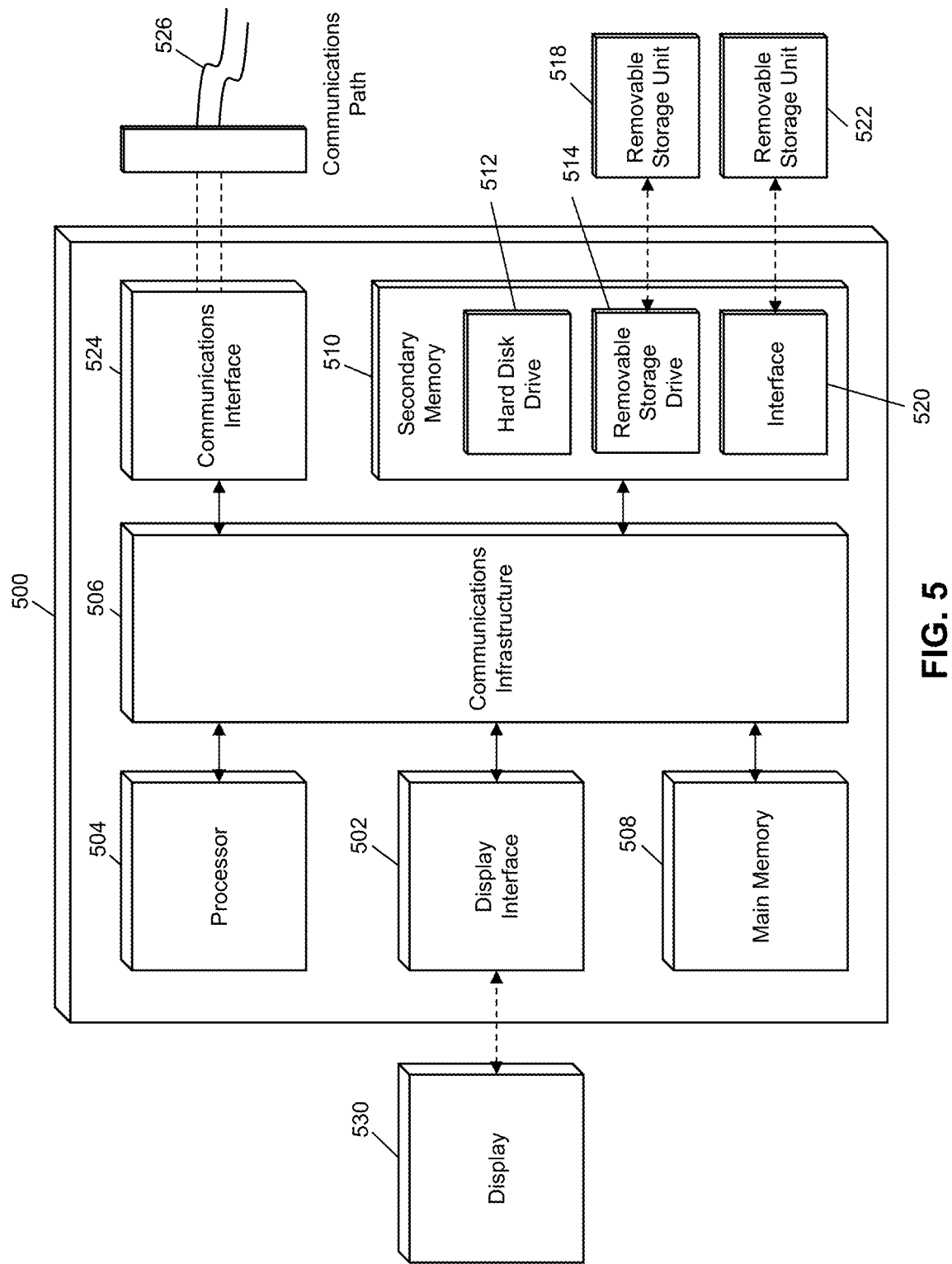
FIG. 5 is a block diagram illustrating a computer system architecture in accordance with exemplary embodiments.

The system 100 may include a blockchain network 108. The blockchain network 108 may be comprised of a plurality of blockchain nodes 110. In an exemplary embodiment, the processing server 102 may be a blockchain node 110. In such cases, each blockchain node 110 may be configured to perform the functions of the processing server 102 as illustrated and discussed herein. Each blockchain node 102 may be computing system, such as illustrated in FIG. 2 and FIG. 5, discussed in more detail below, that is configured to perform functions related to the processing and management of the blockchain, including the generation of blockchain data values, verification of proposed blockchain transactions, verification of digital signatures, generation of new blocks, validation of new blocks, and maintenance of a copy of the blockchain. The blockchain may be a distributed ledger that is comprised of at least a plurality of blocks. Each block may include at least a block header and one or more data values. Each block header may include at least a timestamp, a block reference value, and a data reference value. The timestamp may be a time at which the block header was generated, and may be represented using any suitable method (e.g., UNIX timestamp, DateTime, etc.). The block reference value may be a value that references an earlier block (e.g., based on timestamp) in the blockchain. In some embodiments, a block reference value in a block header may be a reference to the block header of the most recently added block prior to the respective block. In an exemplary embodiment, the block reference value may be a hash value generated via the hashing of the block header of the most recently added block. The data reference value may similarly be a reference to the one or more data values stored in the block that includes the block header. In an exemplary embodiment, the data reference value may be a hash value generated via the hashing of the one or more data values. For instance, the block reference value may be the root of a Merkle tree generated using the one or more data values.

The use of the block reference value and data reference value in each block header may result in the blockchain being immutable. Any attempted modification to a data value would require the generation of a new data reference value for that block, which would thereby require the subsequent block's block reference value to be newly generated, further requiring the generation of a new block reference value in every subsequent block. This would have to be performed and updated in every single node in the blockchain network prior to the generation and addition of a new block to the blockchain in order for the change to be made permanent. Computational and communication limitations may make such a modification exceedingly difficult, if not impossible, thus rendering the blockchain immutable.

In some embodiments, the blockchain may be used to store information regarding blockchain transactions conducted between two different blockchain wallets. A blockchain wallet may include a private key of a cryptographic key pair that is used to generate digital signatures that serve as authorization by a payer for a blockchain transaction, where the digital signature can be verified by the blockchain network 104 using the public key of the cryptographic key pair. In some cases, the term "blockchain wallet" may refer specifically to the private key. In other cases, the term "blockchain wallet" may refer to a recipient device 106 that stores the private key for use thereof in blockchain transactions. For instance, each recipient device 106 may each have their own private key for respective cryptographic key pairs, and may each be a blockchain wallet for use in transactions with the blockchain associated with the blockchain network.

In other embodiments, the blockchain may be used to store any other type of data in an immutable format. For instance, a blockchain may be used to track ownership of land deeds, where changes in ownership may be recorded as direct transfers (e.g., similar to transfers of currency) or where changes may be stored as data. In another example, a blockchain may be used for voting, where votes may be attributed to blockchain wallets and counted accordingly. Other uses for a blockchain for data storage will be apparent to persons having skill in the relevant art. As discussed herein, the storage of any data in a blockchain may be referred to as a "transaction." For instance, in the above example, a change in ownership in land deed or a casted vote in an election may be a "transaction" stored in the blockchain.

In the system 100, the blockchain network 108 may maintain three different blockchains: a balance blockchain, a debit blockchain, and a credit blockchain. The balance blockchain may include blockchain data values that store a current balance for a recipient's blockchain wallet. The balance blockchain may be updated at a predetermined period of time, such as every twenty-four hours. In such cases, a new block may be added at each period that includes a blockchain data value for each recipient 104 where the blockchain data value includes an identifier (e.g., the public key for the recipient's blockchain wallet's cryptographic key pair) and the updated balance for their blockchain wallet.

The credit blockchain may be used to record transactions where the recipient 104 is a payee, with each blockchain data value including the identifier for the recipient 104, the payment amount, and an identifier related to the source of the payment, such as an account number or reference thereto, which may include or be accompanied with information identifying an issuing institution 114 that issued the transaction account used to make the payment. The debit blockchain may be used to record transactions where the recipient 104 is a payer, thus resulting in a debit to their current balance. Each blockchain data value included therein may include an identifier as well as the debit amount representing the payment made by the recipient 104. In some cases, a blockchain data value in the debit blockchain may also include a digital signature generated by the recipient's private key, which is verified as part of the payment made by the recipient 104 to ensure that it is authorized by the actual recipient 104 and not attempted by an unauthorized party. The blockchain data value included in the debit blockchain may also include an identifier for the transaction account to which the payment is to be made from the recipient 104 and information identifying the issuing institution 114 that issued the transaction account used for receiving the payment. In cases where the recipient 104 is to pay another recipient 104, the blockchain data value may include the public key or a blockchain address generated thereby for the blockchain wallet of the intended recipient 104. In an exemplary embodiment, the debit blockchain and credit blockchain may be cleared every period of time where the balance blockchain is updated, as each of the debits and credits will have been reflected in the balance blockchain. The clearing of the debit and credit blockchains may reduce data storage in the blockchain nodes 110 and increase processing speeds for new blockchain data values.

In the system 100, a recipient 104 may have a need to receive payment from a plurality of different payers 112. Each payer 112 may have a transaction account that is issued thereto by an issuing institution 114. Issuing institutions 114 may be financial institutions, such as issuing banks, or other entities that are configured to issue transaction accounts to payers 112 for use in making electronic payment transactions to others, such as recipients 104. Each transaction account may have an account identifier associated therewith, such as a payment account number. Each issuing institution 114 may also have an identifier associated therewith, such as an issuer identification number. In some cases, the account identifier may have the issuer identification number included therein. In some instances, account identifiers as used herein may be encrypted, hashed, or otherwise transformed such that, if the credit blockchain is public, the underlying transaction account may not be compromised. Other methods for obscuring or otherwise transforming primary account numbers for use in the system 100 will be apparent to persons having skill in the relevant art.

A payer 112 may wish to make a payment to the recipient 104. The payer 112 may have a payer device 116, which may be any type of computing device that is specially configured to perform the functions discussed herein. The recipient 104 may provide the public key for their blockchain wallet to the payer 112, such as by an electronic transmission of the public key from the recipient device 106 to the payer device 116. The payer 112 may then submit a credit request to the processing server 102. The credit request may be submitted using any suitable communication network and method, such as via an application program executed by the payer device 116 that may use an application programming interface of the processing server 102. The credit request may include at least the recipient's public key, the payment amount, the account identifier for the payer's transaction account, and, if applicable, the issuer identification number associated with the issuing institution 114 that has issued the transaction account. The processing server 102 may receive the credit request and include the credit request as a new blockchain data value that is included in a new block. The new block may be transmitted to a plurality of other blockchain nodes 110 in the blockchain network 108 and added to the credit blockchain. When payment is made to a recipient 104 from a transaction account, the issuing institution 114 may place a hold on the transaction account for the payment amount. In some cases, the processing server 102 may notify the issuing institution 114 using the account identifier included in the credit request. In other cases, the payer 112 may submit the credit request to their issuing institution 114 via their payer device 116, which may place the hold on the transaction account and submit the credit request to the processing server 102.

When the recipient 104 wants to make a payment, they may use their recipient device 106 to submit a debit request to the processing server 102 using any suitable communication network and method, such as via an application programming interface of the processing server 102, a web page accessible by the recipient device 106, etc. As part of the debit request, the recipient 104 may, using the recipient device 106, generate a digital signature using the private key of the recipient's cryptographic key pair. The debit request submitted to the processing server 102 may include the digital signature, the payment amount, and information associated with the account used to receive the payment, such as a public key or blockchain address for another recipient's blockchain wallet or an account identifier (and issuer identification number, if applicable) for a transaction account. The processing server 102 may receive the debit request and may generate a new blockchain data value that is included in a new block generated for the debit blockchain. The new block may be electronically transmitted to a plurality of the blockchain nodes 110 in the blockchain network 108, where the blockchain nodes 110 may confirm the new block and include it in the debit blockchain using traditional methods. In some instances, the processing server 102 may first verify that the recipient 104 has a suitable balance for the payment, which may include checking the balance blockchain as well as any current debits and credits in the respective blockchains, and comparing the values to identify a current balance compared to the payment amount.

The recipient 104 may continue to receive payments and make payments, where new blockchain data values associated therewith may be added into the credit blockchain and debit blockchain, respectively. After a predetermined period of time, the processing server 102 may update the balances for each of the recipients 104 in the system 100. Updating of the balances may include identifying the most recent balance for the recipient 104 in the balance blockchain (e.g., using the public key for identification) as well as each of the credit requests and debit requests included in the respective blockchains and adjusting the balance accordingly. For instance, if the recipient starts with $100, has two debits for $40 each, and three credits for $20 each, the new balance would be $80. The processing server 102 may include the new balance in a new blockchain data value that also includes the recipient's public key. The new blockchain data value for each of the recipients 104 may be included in a new block that is transmitted to a plurality of other blockchain nodes 110 in the blockchain network 108. Each of the blockchain nodes 110 may confirm the new block, which may then be distributed to each blockchain node 110 in the blockchain network 108 and added to the balance block. Once the balance blockchain has been updated, the debit blockchain and credit blockchain may be cleared. Clearing of the debit blockchain and credit blockchain may include deletion of the existing blocks in each of the debit blockchain and credit blockchain, as the debits and credits were already taken into account in the updated balances. In cases where debits and credits are both received for a recipient 104, even if the balance is not modified (e.g., the debit amount and credit amount are the same), holds may need to be updated due to the transaction accounts involved. For instance, if the recipient 104 receives $20 for use with a transaction account issued by an issuing institution 114 where a hold does not currently exists, and spends $20 from a transaction account of a different issuing institution 114, the existing hold would need to be removed.

When the balances are updated and the balance for a recipient 104 is adjusted, this indicates that a transaction account hold must be updated and/or removed, or that a transaction account must be credited as a result of a payment. The processing server 102 may electronically transmit notifications to issuing institutions 114 informing them of payments made from a transaction account or to a transaction account as a result of the activity of the recipient 104. In the case of removal of a hold, the processing server 102 may notify the issuing institution 114 of the account identifier and the payment amount that was made. If the payment amount is less than the hold, the hold may be reduced by the respective amount. In cases where there are multiple holds in place from multiple transaction accounts for a recipient 104, the processing server 102 may select one or more holds for updating based on a reduced account balance. The processing server 102 may select the holds based on any suitable criteria, such as hold amounts and the balance debit amount, length of time for a hold, issuer preference, recipient preferences, and fees for the issuing institutions 114, etc. For instance, a recipient 104 may receive $50 from a first issuing institution 114 and $30 from a second issuing institution 114, where holds are placed on the transaction accounts used for the payments. In one example, if the recipient's balance is updated to only $30, the first issuing institution 114 may be notified as the entire hold could be removed. In another example, if the balance is updated to $40, both issuing institutions 114 may be notified as the second hold could be removed and the first hold updated. In yet another example, the processing server 102 may request removal of the holds based on age of the holds, such as where the oldest hold gets removed first.

In some cases, information regarding each of the holds related to a blockchain wallet may be stored in the balance blockchain. For instance, a blockchain data value in the balance blockchain may include the related account identifier for each hold, and any additional information associated therewith, such as the current amount, date of the hold, etc. In another instance, the processing server 102 may maintain a separate blockchain or other database for storing hold information, which may be referenced using the private key of the recipient's blockchain wallet. In such instances, if a balance is debited during an update (e.g., due to the recipient 104 spending a portion of their balance), the processing server 102 may identify the current holds using the public key in the separate database or blockchain accordingly. In these instances, the database or separate blockchain may be updated once a hold has been updated or removed, as discussed above.

The methods and systems discussed herein enable recipients 104 to receive payments from payers 112 despite lacking a transaction account, through the use of a recipient device 106 operating a blockchain wallet. Three distinct blockchains are used to track the recipient's balance on a periodic basis and keep an accounting of debits and credits in between periods. The recipient 104 can receive payment from a payer 112 via a hold placed on the payer's transaction account, where use of the payment is registered in the balance blockchain after it has been first applied as a credit in the credit blockchain. After the amount has been used (and the debit applied and then the balance updated at the next period), the hold can then be removed. This removes the need for issuing institutions to be involved in any transactions until the payment is utilized. If the recipient 104 makes a payment to another transaction account at the same issuing institution 114, the need for a payment would be removed entirely. Similarly, the aggregation of debits and credits during each period could reduce inter-bank settlements depending on the sources and destinations for payments involving the recipient 104. As a result, the methods and systems discussed herein enable a recipient 104 to receive payments without a transaction account, while still minimizing inter-bank settlement and payment transactions involving issuing institutions 114.

Processing Server

FIG. 2 illustrates an embodiment of a processing server 102 in the system 100. It will be apparent to persons having skill in the relevant art that the embodiment of the processing server 102 illustrated in FIG. 2 is provided as illustration only and may not be exhaustive to all possible configurations of the processing server 102 suitable for performing the functions as discussed herein. For example, the computer system 500 illustrated in FIG. 5 and discussed in more detail below may be a suitable configuration of the processing server 102. In some cases, each blockchain node 110 in the system 100 may be configured similar to the processing server 102 in FIG. 2 or computer system 500 in FIG. 5, such as including the components illustrated therein.

The processing server 102 may include a receiving device 202. The receiving device 202 may be configured to receive data over one or more networks via one or more network protocols. In some instances, the receiving device 202 may be configured to receive data from recipient devices 106, blockchain nodes 110, issuing institutions 114, payer devices 116, and other systems and entities via one or more communication methods, such as radio frequency, local area networks, wireless area networks, cellular communication networks, Bluetooth, the Internet, etc. In some embodiments, the receiving device 202 may be comprised of multiple devices, such as different receiving devices for receiving data over different networks, such as a first receiving device for receiving data over a local area network and a second receiving device for receiving data via the Internet. The receiving device 202 may receive electronically transmitted data signals, where data may be superimposed or otherwise encoded on the data signal and decoded, parsed, read, or otherwise obtained via receipt of the data signal by the receiving device 202. In some instances, the receiving device 202 may include a parsing module for parsing the received data signal to obtain the data superimposed thereon. For example, the receiving device 202 may include a parser program configured to receive and transform the received data signal into usable input for the functions performed by the processing device to carry out the methods and systems described herein.

The receiving device 202 may be configured to receive data signals electronically transmitted by recipient devices 106 that are superimposed or otherwise encoded with debit requests for payments to be made by the recipient 104. Each debit request may include at least a digital signature, payment amount, and an account identifier for the recipient of the payment. The receiving device 202 may also be configured to receive data signals electronically transmitted by blockchain nodes 110, which may be superimposed or otherwise encoded with new blocks or blockchain data values, confirmations for submitted blocks, public keys, etc. The receiving device 202 may be configured to receive data signals electronically transmitted by issuing institutions 114 and/or payer devices 116 that may be superimposed or otherwise encoded with credit requests for payments to recipients 104, where each payment request may include an account identifier for the transaction account from which the payment is made, an issuer identification number, if applicable, the public key of the recipient 104, and the payment amount.

The processing server 102 may also include a communication module 204. The communication module 204 may be configured to transmit data between modules, engines, databases, memories, and other components of the processing server 102 for use in performing the functions discussed herein. The communication module 204 may be comprised of one or more communication types and utilize various communication methods for communications within a computing device. For example, the communication module 204 may be comprised of a bus, contact pin connectors, wires, etc. In some embodiments, the communication module 204 may also be configured to communicate between internal components of the processing server 102 and external components of the processing server 102, such as externally connected databases, display devices, input devices, etc. The processing server 102 may also include a processing device. The processing device may be configured to perform the functions of the processing server 102 discussed herein as will be apparent to persons having skill in the relevant art. In some embodiments, the processing device may include and/or be comprised of a plurality of engines and/or modules specially configured to perform one or more functions of the processing device, such as a querying module 214, generation module 216, selection module 218, etc. As used herein, the term "module" may be software or hardware particularly programmed to receive an input, perform one or more processes using the input, and provides an output. The input, output, and processes performed by various modules will be apparent to one skilled in the art based upon the present disclosure.

The processing server 102 may also include a memory 226. The memory 226 may be configured to store data for use by the processing server 102 in performing the functions discussed herein, such as public and private keys, symmetric keys, etc. The memory 226 may be configured to store data using suitable data formatting methods and schema and may be any suitable type of memory, such as read-only memory, random access memory, etc. The memory 226 may include, for example, encryption keys and algorithms, communication protocols and standards, data formatting standards and protocols, program code for modules and application programs of the processing device, and other data that may be suitable for use by the processing server 102 in the performance of the functions disclosed herein as will be apparent to persons having skill in the relevant art. In some embodiments, the memory 226 may be comprised of or may otherwise include a relational database that utilizes structured query language for the storage, identification, modifying, updating, accessing, etc. of structured data sets stored therein. The memory 226 may be configured to store, for example, cryptographic keys, salts, nonces, communication information for the back-end system, etc.

The memory 226 may be configured to store algorithms for use in generating blocks for the blockchains and validating digital signatures, algorithms for the identification of holds to be removed, and other data for use in performing the functions of the processing server 102 as discussed herein. The processing server 102 may also be configured to store blockchain data 206, which may be included in the memory 226 or stored separately in the processing server 102 or in an external storage accessible by the processing server 102. The blockchain data 206 may include at least a balance blockchain, credit blockchain, and debit blockchain, as discussed herein. In some cases, a separate blockchain may be used to store information regarding holds related to a recipient's blockchain wallet.

The processing server 102 may include a querying module 214. The querying module 214 may be configured to execute queries on databases to identify information. The querying module 214 may receive one or more data values or query strings, and may execute a query string based thereon on an indicated database, such as the memory 226 of the processing server 102 to identify information stored therein. The querying module 214 may then output the identified information to an appropriate engine or module of the processing server 102 as necessary. The querying module 214 may, for example, execute a query on the blockchain data 206 of the processing server 102 to identify blockchain data values for use in generating new blockchain data values, such as for validating new payments and updating balances.

The processing server 102 may also include a generation module 216. The generation module 216 may be configured to generate data for use by the processing server 102 in performing the functions discussed herein. The generation module 216 may receive instructions as input, may generate data based on the instructions, and may output the generated data to one or more modules of the processing server 102. For example, the generation module 216 may be configured to generate headers and blockchain data values that are included in new blocks generated for balance blockchains, credit blockchains, and debit blockchains. The generation module 216 may also be configured to generate notifications for transmission to issuing institutions 114 regarding the adding, updating, or removal of holds, which may include amounts, account identifiers, and any other data necessary for use thereby.

The processing server 102 may also include a selection module 218. The selection module 218 may be configured to perform selections for the processing server 102 as part of the functions discussed herein. The selection module 218 may receive instructions as input, may perform a selection as requested, and may output a result of the selection to another module or engine of the processing server 102. The selection module 218 may, for example, be configured to select holds to be updated or removed based on debit and credit transactions involving a recipient 104. Selections may be based on any suitable criteria, such as recipient preferences, issuing institution preferences, hold amounts, payment amounts, hold dates, etc.

The processing server 102 may also include a transmitting device 224. The transmitting device 224 may be configured to transmit data over one or more networks via one or more network protocols. In some instances, the transmitting device 224 may be configured to transmit data to recipient devices 106, blockchain nodes 110, issuing institutions 114, payer devices 116, and other entities via one or more communication methods, local area networks, wireless area networks, cellular communication, Bluetooth, radio frequency, the Internet, etc. In some embodiments, the transmitting device 224 may be comprised of multiple devices, such as different transmitting devices for transmitting data over different networks, such as a first transmitting device for transmitting data over a local area network and a second transmitting device for transmitting data via the Internet. The transmitting device 224 may electronically transmit data signals that have data superimposed that may be parsed by a receiving computing device. In some instances, the transmitting device 224 may include one or more modules for superimposing, encoding, or otherwise formatting data into data signals suitable for transmission.

The transmitting device 224 may be configured to electronically transmit data signals to recipient devices 106, which may be superimposed or otherwise encoded with balance update notifications, hold update notifications, cryptographic key data, and other data as discussed herein. The transmitting device 224 may also be configured to electronically transmit data signals to blockchain nodes 110, which may be superimposed or otherwise encoded with new blockchain data values, new blocks for confirmation, or confirmations of received blocks. The transmitting device 224 may be configured to electronically transmit data signals to issuing institutions 114 that are superimposed or otherwise encoded with notifications regarding holds on transaction accounts, such as for the adding, updating, or removal thereof.

Process for Using Blockchains for Minimizing Inter-Bank Settlements

Figure 3:
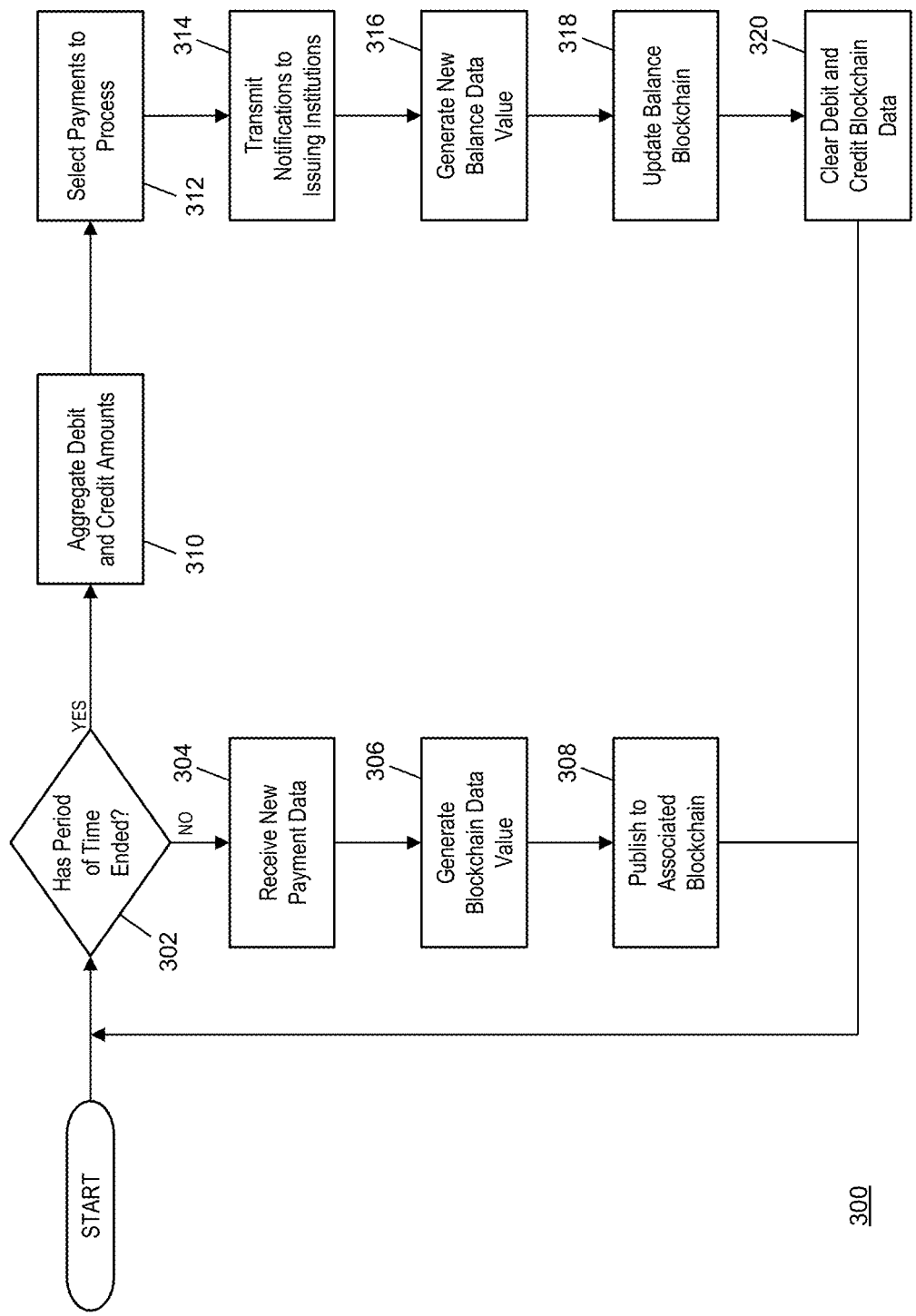
FIG. 3 is a flow diagram illustrating a process for settling payee accounts on blockchains to minimize inter-bank settlement using the processing server in the system of FIG. 1 in accordance with exemplary embodiments.

FIG. 3 illustrates an example process 300 for minimizing inter-bank settlements while enabling recipients 104 to receive and use payments without a transaction account via the use of blockchains as executed by the processing server 102 as illustrated in FIG. 2 and used in the system 100 of FIG. 1.

In step 302, the processing server 102 may determine if the period of time between balance updates has ended. This determination may be based on a period of time, such as stored in the memory 226 of the processing server 102, and an amount of time that has passed since the last balance update, such as identified from a timestamp in the most recent block added to the balance blockchain. If the period of time has not yet ended, then, in step 304, the receiving device 202 of the processing server 102 may receive data regarding a new payment. The new payment data may include a debit request submitted by a recipient 104 via a recipient device 106 or a credit request, such as submitted by an issuing institution 114 or payer device 116. The request may include a public key and/or digital signature for the recipient 104, an account identifier for the transaction account where the payment is being made to or from, and the payment amount.

In step 306, the generation module 216 of the processing server 102 may generate a new blockchain data value that includes the data included in the received new payment data, and may also generate a new block that includes the new blockchain data value for the respective blockchain. In cases where the new payment data is a debit request from the recipient 104, the processing server 102 may first validate the digital signature provided therewith using the public key of the recipient's blockchain wallet, and may also validate that the recipient 104 has sufficient balance for the payment. In step 308, the transmitting device 224 of the processing server 102 may electronically transmit the newly generated block to a plurality of blockchain nodes 110 for confirmation thereof and publication in the associated blockchain. The process 300 may then return to step 302 and await receipt of new payment data or ending of the predetermined period of time.

Once, in step 302, the predetermined period of time has ended, then, in step 310, the processing server 102 may aggregate the debit and credit amounts for each recipient's blockchain wallet. In step 312, the selection module 218 of the processing server 102 may select payments to process. The selection may be based on the amounts of the credits and debits, the issuing institutions 114 associated therewith, the balance of the recipient's blockchain wallet, and applicable criteria, as discussed herein. In step 314, the transmitting device 224 of the processing server 102 may electronically transmit notifications to any applicable issuing institutions 114 regarding account holds, which may include an account identifier, an amount, and an indication of if the hold should be added, update, or removed.

In step 316, the generation module 216 of the processing server 102 may generate a new balance data value for the balance blockchain, where the new balance data value includes the updated balance for the recipient's blockchain wallet, their public key or other account identifier, and, if applicable, updated account hold information for transaction accounts related to the recipient 104. In step 318, the transmitting device 224 of the processing server 102 may transmit a new block including the newly generated balance data value to a plurality of blockchain nodes 110 in the blockchain network 108 for confirmation and addition to the balance blockchain. In step 320, the querying module 214 of the processing server 102 may execute a query on the blockchain data 206 of the processing server 102 to clear the balance and credit blockchains. The process 300 may then return to step 302 and await new payments to occur or the ending of another period of time.

Exemplary Method for Minimizing Inter-Bank Settlements

Figure 4:
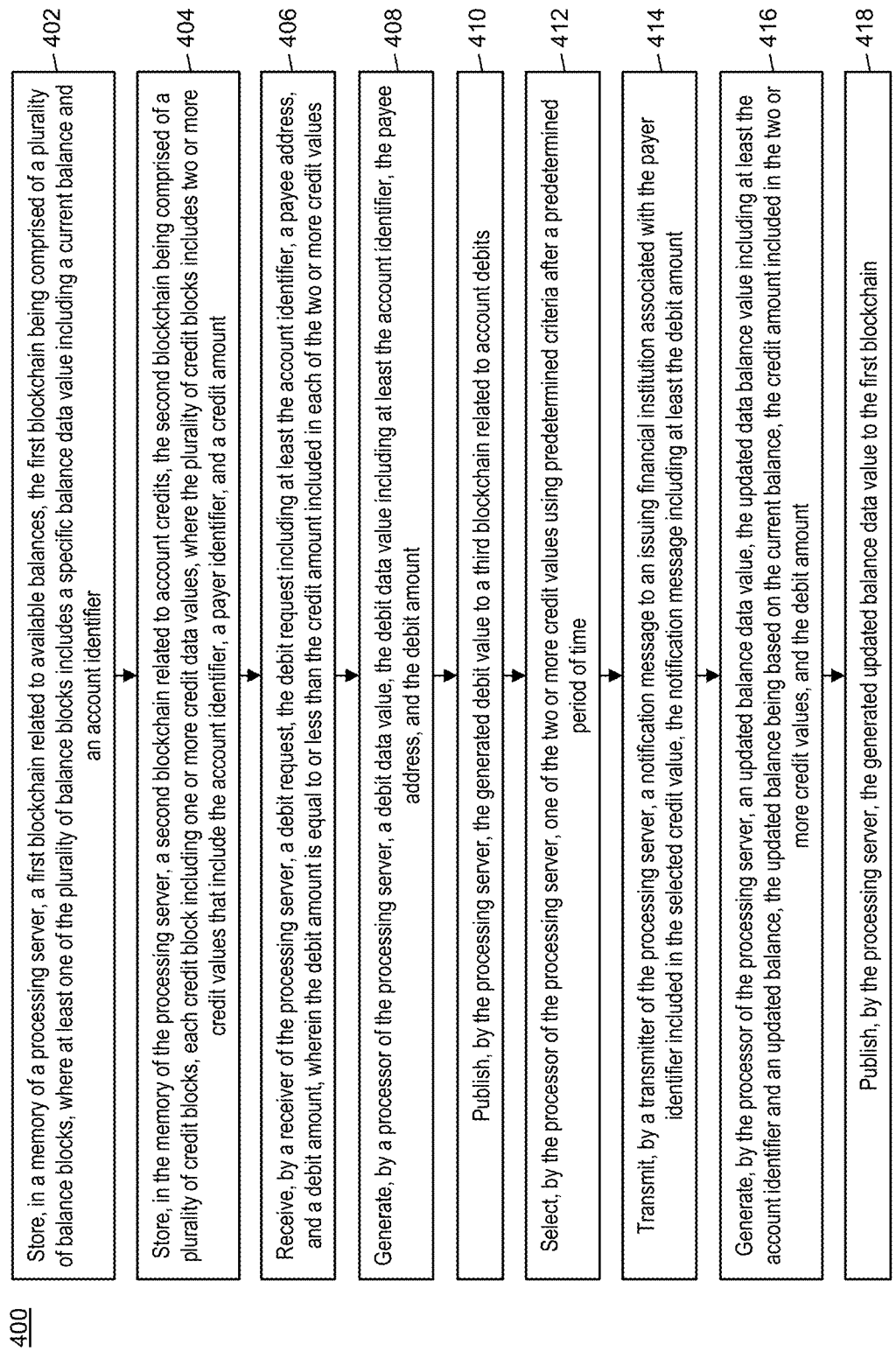
FIG. 4 is a flow chart illustrating an exemplary method for minimizing inter-bank settlement through incremental updates stored via blockchains in accordance with exemplary embodiments.

FIG. 4 illustrates a method 400 for minimizing inter-bank settlement through incremental updates stored via multiple blockchains.

In step 402, a first blockchain related to available balances may be stored in a memory (e.g., blockchain data 206, memory 226, etc.) of a processing server (e.g., the processing server 102), where the first blockchain is comprised of a plurality of balance blocks, where at least one of the plurality of balance blocks includes a specific balance data value including a current balance and an account identifier. In step 404, a second blockchain related to account credits may be stored in the memory of the processing server, where the second blockchain is comprised of a plurality of credit blocks, each credit block including one or more credit data values, where the plurality of credit blocks includes two or more credit values that include the account identifier, a payer identifier, and a credit amount. In step 406, a debit request may be received by a receiver (e.g., the receiving device 202) of the processing server, the debit request including at least the account identifier, a payee address, and a debit amount, wherein the debit amount is equal to or less than the credit amount included in each of the two or more credit values.

In step 408, a debit data values may be generated by a processor (e.g., the generation module 216) of the processing server, the debit data value including at least the account identifier, the payee address, and the debit amount. In step 410, the generated debit value may be published by the processing server (e.g., via the transmitting device 224 thereof) to a third blockchain related to account debits. In step 412, one of the two or more credit values may be selected by the processor (e.g., the selection module 218) of the processing server using predetermined criteria after a predetermined period of time.

In step 414, a notification message may be transmitted by a transmitter (e.g., the transmitting device 224) of the processing server to an issuing financial institution (e.g., an issuing institution 114) associated with the payer identifier included in the selected credit value, the notification message including at least the debit amount. In step 416, an updated balance data value may be generated by the processor of the processing server, the updated data balance value including at least the account identifier and an updated balance, the updated balance being based on the current balance, the credit amount included in the two or more credit values, and the debit amount. In step 418, the generated updated balance data value may be published to the first blockchain by the processing server.

In one embodiment, publishing the generated updated balance data value may include: generating, by the processor of the processing server, a new balance block, the new balance block including a block header and one or more balance data values, the one or more balance data values including the generated updated balance data value; and transmitting, by the transmitter of the processing server, the generated new balance block to a plurality of nodes associated with the first blockchain. In some embodiments, publishing the generated updated balance data value may include transmitting, by the transmitter of the processing server, the generated updated balance data value to a plurality of nodes associated with the first blockchain.

In one embodiment, the method 400 may further include clearing, by the processing server, the second blockchain and the third blockchain after the predetermined period of time. In a further embodiment, clearing the second blockchain and the third blockchain may include transmitting, by the transmitter of the processing server, a clearing instruction to a plurality of nodes associated with the second blockchain and the third blockchain. In another further embodiment, clearing the second blockchain and the third blockchain may include deleting, in the memory of the processing server, the plurality of credit blocks in the second blockchain and a plurality of debit blocks in the third blockchain.

In some embodiments, the predetermined period of time may be twenty-four hours. In one embodiment, the predetermined criteria may include at least one of: account preferences, the credit amount included in each of the two or more credit values, a difference between the debit amount and the credit amount included in each respective credit value of the two or more credit values, and fees associated with a financial institution corresponding to the payer identifier included in each respective credit value of the two or more credit values.

Computer System Architecture

FIG. 5 illustrates a computer system 500 in which embodiments of the present disclosure, or portions thereof, may be implemented as computer-readable code. For example, the processing server 102 and blockchain nodes 110 of FIG. 1 may be implemented in the computer system 500 using hardware, software, firmware, non-transitory computer readable media having instructions stored thereon, or a combination thereof and may be implemented in one or more computer systems or other processing systems. Hardware, software, or any combination thereof may embody modules and components used to implement the methods of FIGS. 3 and 4.

If programmable logic is used, such logic may execute on a commercially available processing platform configured by executable software code to become a specific purpose computer or a special purpose device (e.g., programmable logic array, application-specific integrated circuit, etc.). A person having ordinary skill in the art may appreciate that embodiments of the disclosed subject matter can be practiced with various computer system configurations, including multi-core multiprocessor systems, minicomputers, mainframe computers, computers linked or clustered with distributed functions, as well as pervasive or miniature computers that may be embedded into virtually any device. For instance, at least one processor device and a memory may be used to implement the above described embodiments.

A processor unit or device as discussed herein may be a single processor, a plurality of processors, or combinations thereof. Processor devices may have one or more processor "cores." The terms "computer program medium," "non-transitory computer readable medium," and "computer usable medium" as discussed herein are used to generally refer to tangible media such as a removable storage unit 518, a removable storage unit 522, and a hard disk installed in hard disk drive 512.

Various embodiments of the present disclosure are described in terms of this example computer system 500. After reading this description, it will become apparent to a person skilled in the relevant art how to implement the present disclosure using other computer systems and/or computer architectures. Although operations may be described as a sequential process, some of the operations may in fact be performed in parallel, concurrently, and/or in a distributed environment, and with program code stored locally or remotely for access by single or multi-processor machines. In addition, in some embodiments the order of operations may be rearranged without departing from the spirit of the disclosed subject matter.

Processor device 504 may be a special purpose or a general purpose processor device specifically configured to perform the functions discussed herein. The processor device 504 may be connected to a communications infrastructure 506, such as a bus, message queue, network, multi-core message-passing scheme, etc. The network may be any network suitable for performing the functions as disclosed herein and may include a local area network (LAN), a wide area network (WAN), a wireless network (e.g., WiFi), a mobile communication network, a satellite network, the Internet, fiber optic, coaxial cable, infrared, radio frequency (RF), or any combination thereof. Other suitable network types and configurations will be apparent to persons having skill in the relevant art. The computer system 500 may also include a main memory 508 (e.g., random access memory, read-only memory, etc.), and may also include a secondary memory 510. The secondary memory 510 may include the hard disk drive 512 and a removable storage drive 514, such as a floppy disk drive, a magnetic tape drive, an optical disk drive, a flash memory, etc.

The removable storage drive 514 may read from and/or write to the removable storage unit 518 in a well-known manner. The removable storage unit 518 may include a removable storage media that may be read by and written to by the removable storage drive 514. For example, if the removable storage drive 514 is a floppy disk drive or universal serial bus port, the removable storage unit 518 may be a floppy disk or portable flash drive, respectively. In one embodiment, the removable storage unit 518 may be non-transitory computer readable recording media.

In some embodiments, the secondary memory 510 may include alternative means for allowing computer programs or other instructions to be loaded into the computer system 500, for example, the removable storage unit 522 and an interface 520. Examples of such means may include a program cartridge and cartridge interface (e.g., as found in video game systems), a removable memory chip (e.g., EEPROM, PROM, etc.) and associated socket, and other removable storage units 522 and interfaces 520 as will be apparent to persons having skill in the relevant art.

Data stored in the computer system 500 (e.g., in the main memory 508 and/or the secondary memory 510) may be stored on any type of suitable computer readable media, such as optical storage (e.g., a compact disc, digital versatile disc, Blu-ray disc, etc.) or magnetic tape storage (e.g., a hard disk drive). The data may be configured in any type of suitable database configuration, such as a relational database, a structured query language (SQL) database, a distributed database, an object database, etc. Suitable configurations and storage types will be apparent to persons having skill in the relevant art.

The computer system 500 may also include a communications interface 524. The communications interface 524 may be configured to allow software and data to be transferred between the computer system 500 and external devices. Exemplary communications interfaces 524 may include a modem, a network interface (e.g., an Ethernet card), a communications port, a PCMCIA slot and card, etc. Software and data transferred via the communications interface 524 may be in the form of signals, which may be electronic, electromagnetic, optical, or other signals as will be apparent to persons having skill in the relevant art. The signals may travel via a communications path 526, which may be configured to carry the signals and may be implemented using wire, cable, fiber optics, a phone line, a cellular phone link, a radio frequency link, etc.

The computer system 500 may further include a display interface 502. The display interface 502 may be configured to allow data to be transferred between the computer system 500 and external display 530. Exemplary display interfaces 502 may include high-definition multimedia interface (HDMI), digital visual interface (DVI), video graphics array (VGA), etc. The display 530 may be any suitable type of display for displaying data transmitted via the display interface 502 of the computer system 500, including a cathode ray tube (CRT) display, liquid crystal display (LCD), light-emitting diode (LED) display, capacitive touch display, thin-film transistor (TFT) display, etc.

Computer program medium and computer usable medium may refer to memories, such as the main memory 508 and secondary memory 510, which may be memory semiconductors (e.g., DRAMs, etc.). These computer program products may be means for providing software to the computer system 500. Computer programs (e.g., computer control logic) may be stored in the main memory 508 and/or the secondary memory 510. Computer programs may also be received via the communications interface 524. Such computer programs, when executed, may enable computer system 500 to implement the present methods as discussed herein. In particular, the computer programs, when executed, may enable processor device 504 to implement the methods illustrated by FIGS. 3 and 4, as discussed herein. Accordingly, such computer programs may represent controllers of the computer system 500. Where the present disclosure is implemented using software, the software may be stored in a computer program product and loaded into the computer system 500 using the removable storage drive 514, interface 520, and hard disk drive 512, or communications interface 524.

The processor device 504 may comprise one or more modules or engines configured to perform the functions of the computer system 500. Each of the modules or engines may be implemented using hardware and, in some instances, may also utilize software, such as corresponding to program code and/or programs stored in the main memory 508 or secondary memory 510. In such instances, program code may be compiled by the processor device 504 (e.g., by a compiling module or engine) prior to execution by the hardware of the computer system 500. For example, the program code may be source code written in a programming language that is translated into a lower level language, such as assembly language or machine code, for execution by the processor device 504 and/or any additional hardware components of the computer system 500. The process of compiling may include the use of lexical analysis, preprocessing, parsing, semantic analysis, syntax-directed translation, code generation, code optimization, and any other techniques that may be suitable for translation of program code into a lower level language suitable for controlling the computer system 500 to perform the functions disclosed herein. It will be apparent to persons having skill in the relevant art that such processes result in the computer system 500 being a specially configured computer system 500 uniquely programmed to perform the functions discussed above.

Techniques consistent with the present disclosure provide, among other features, systems and methods for minimizing inter-bank settlement through incremental updates stored via blockchains. While various exemplary embodiments of the disclosed system and method have been described above it should be understood that they have been presented for purposes of example only, not limitations. It is not exhaustive and does not limit the disclosure to the precise form disclosed. Modifications and variations are possible in light of the above teachings or may be acquired from practicing of the disclosure, without departing from the breadth or scope.

What is claimed is:

1. A method for minimizing inter-bank settlement through incremental updates stored via blockchains, comprising:
   storing, in a memory of a processing server, a first blockchain related to available balances, the first blockchain being comprised of a plurality of balance blocks, where at least one of the plurality of balance blocks includes a specific balance data value including a current balance and an account identifier;
   storing, in the memory of the processing server, a second blockchain related to account credits, the second blockchain being comprised of a plurality of credit blocks, each credit block including one or more credit data values, where the plurality of credit blocks includes two or more credit values that include the account identifier, a payer identifier, and a credit amount;
   receiving, by a receiver of the processing server, a debit request, the debit request including at least the account identifier, a payee address, and a debit amount, wherein the debit amount is equal to or less than the credit amount included in each of the two or more credit values;
   generating, by a processor of the processing server, a debit data value, the debit data value including at least the account identifier, the payee address, and the debit amount;
   publishing, by the processing server, the generated debit value to a third blockchain related to account debits;
   selecting, by the processor of the processing server, one of the two or more credit values using predetermined criteria after a predetermined period of time;
   transmitting, by a transmitter of the processing server, a notification message to an issuing financial institution associated with the payer identifier included in the selected credit value, the notification message including at least the debit amount;
   generating, by the processor of the processing server, an updated balance data value, the updated data balance value including at least the account identifier and an updated balance, the updated balance being based on the current balance, the credit amount included in the two or more credit values, and the debit amount; and
   publishing, by the processing server, the generated updated balance data value to the first blockchain.

2. The method of claim 1, wherein the publishing of the generated updated balance data value includes:
   generating, by the processor of the processing server, a new balance block, the new balance block including a block header and one or more balance data values, the one or more balance data values including the generated updated balance data value; and
   transmitting, by the transmitter of the processing server, the generated new balance block to a plurality of nodes associated with the first blockchain.

3. The method of claim 1, wherein the publishing of the generated updated balance data value includes transmitting, by the transmitter of the processing server, the generated updated balance data value to a plurality of nodes associated with the first blockchain.

4. The method of claim 1, further comprising:
   clearing, by the processing server, the second blockchain and the third blockchain after the predetermined period of time.

5. The method of claim 4, where the clearing of the second blockchain and the third blockchain includes transmitting, by the transmitter of the processing server, a clearing instruction to a plurality of nodes associated with the second blockchain and the third blockchain.

6. The method of claim 4, wherein the clearing of the second blockchain and the third blockchain includes deleting, in the memory of the processing server, the plurality of credit blocks in the second blockchain and a plurality of debit blocks in the third blockchain.

7. The method of claim 1, wherein the predetermined period of time is twenty-four hours.

8. The method of claim 1, wherein the predetermined criteria includes at least one of: account preferences, the credit amount included in each of the two or more credit values, a difference between the debit amount and the credit amount included in each respective credit value of the two or more credit values, and fees associated with a financial institution corresponding to the payer identifier included in each respective credit value of the two or more credit values.

9. A non-transitory computer readable recording media of a processing server storing program code, the processing server including a processor configured to execute a method for minimizing inter-bank settlement through incremental updates stored via blockchains, the method comprising:

storing, in the memory of the processing server, a first blockchain related to available balances, the first blockchain being comprised of a plurality of balance blocks, where at least one of the plurality of balance blocks includes a specific balance data value including a current balance and an account identifier;

storing, in the memory of the processing server, a second blockchain related to account credits, the second blockchain being comprised of a plurality of credit blocks, each credit block including one or more credit data values, where the plurality of credit blocks includes two or more credit values that include the account identifier, a payer identifier, and a credit amount;

receiving, by a receiver of the processing server, a debit request, the debit request including at least the account identifier, a payee address, and a debit amount, wherein the debit amount is equal to or less than the credit amount included in each of the two or more credit values;

generating, by the processor of the processing server, a debit data value, the debit data value including at least the account identifier, the payee address, and the debit amount;

publishing, by the processing server, the generated debit value to a third blockchain related to account debits;

selecting, by the processor of the processing server, one of the two or more credit values using predetermined criteria after a predetermined period of time;

transmitting, by a transmitter of the processing server, a notification message to an issuing financial institution associated with the payer identifier included in the selected credit value, the notification message including at least the debit amount;

generating, by the processor of the processing server, an updated balance data value, the updated data balance value including at least the account identifier and an updated balance, the updated balance being based on the current balance, the credit amount included in the two or more credit values, and the debit amount; and publishing, by the processing server, the generated updated balance data value to the first blockchain.

10. The non-transitory computer readable recording media of claim 9, wherein the publishing of the generated updated balance data value includes:

generating, by the processor of the processing server, a new balance block, the new balance block including a block header and one or more balance data values, the one or more balance data values including the generated updated balance data value; and transmitting, by the transmitter of the processing server, the generated new balance block to a plurality of nodes associated with the first blockchain.

11. The non-transitory computer readable recording media of claim 9, wherein the publishing of the generated updated balance data value includes transmitting, by the transmitter of the processing server, the generated updated balance data value to a plurality of nodes associated with the first blockchain.

12. The non-transitory computer readable recording media of claim 9, wherein the method further includes clearing, by the processing server, the second blockchain and the third blockchain after the predetermined period of time.

13. The non-transitory computer readable recording media of claim 12, where the clearing of the second blockchain and the third blockchain includes transmitting, by the transmitter of the processing server, a clearing instruction to a plurality of nodes associated with the second blockchain and the third blockchain.

14. The non-transitory computer readable recording media of claim 12, wherein the clearing of the second blockchain and the third blockchain includes deleting, in the memory of the processing server, the plurality of credit blocks in the second blockchain and a plurality of debit blocks in the third blockchain.

15. The non-transitory computer readable recording media of claim 9, wherein the predetermined period of time is twenty-four hours.

16. The non-transitory computer readable recording media of claim 9, wherein the predetermined criteria includes at least one of: account preferences, the credit amount included in each of the two or more credit values, a difference between the debit amount and the credit amount included in each respective credit value of the two or more credit values, and fees associated with a financial institution corresponding to the payer identifier included in each respective credit value of the two or more credit values.

* * * * *